United States Patent Office 3,408,322
Patented Oct. 29, 1968

3,408,322
POLYOLEFIN-PIGMENT BLENDS
Kenneth R. Mills, Bartlesville, Okla., assignor to Phillips
Petroleum Company, a corporation of Delaware
No Drawing. Filed May 16, 1966, Ser. No. 550,102
5 Claims. (Cl. 260—41)

ABSTRACT OF THE DISCLOSURE

Olefin polymer-pigment blends are prepared by mixing together the pigment with a small amount of a blowing agent and blending the mixture thus formed with the olefin polymer under conditions to disperse the pigment uniformly through the polymer.

This invention relates to polyolefin-pigment blends. In one of its aspects it relates to a polyolefin-pigment blend having improved stability obtained by mixing a blowing agent in an amount insufficient to cause substantial blowing with the pigment prior to blending of the pigment and the polyolefin.

The stability of polyolefin-carbon black blends, as indicated, for example, by the change in tensile strength or elongation on aging, appears to be related to the degree of dispersion obtained in the blending operation. It is known that good dispersions of carbon black in polyolefins are difficult to obtain. Extreme techniques such as long milling time, low temperature milling, and special masterbatching are sometimes used to obtain good dispersion. I have now discovered quite unexpectedly that polyolefin-carbon black blends having considerably improved stability are obtained simply by mixing a small amount of a blowing agent with the carbon black prior to blending the carbon black and polyolefin.

It is an object of this invention to provide an improved polyolefin-pigment blend.

It is a still further object of this invention to provide a polyolefin-carbon black blend having improved stability.

It is a still further object of this invention to provide a method for blending a pigment with a polyolefin.

It is a still further object of this invention to provide a method for blending carbon black with olefin polymers.

Other aspects, objects, and several advantages of this invention are apparent to one skilled in the art from a study of this disclosure and the appended claims.

According to the invention, an improved stability polyolefin-pigment blend is obtained by mixing a small amount of a blowing agent with the pigment prior to blending the pigment with polyolefin. The blowing agent is present in an amount insufficient to cause any substantial blowing of the polymer.

The polyolefin-pigment blend, according to the invention, has improved stability.

In one embodiment, carbon black is mixed with a blowing agent such as azobisformamide, and the mixture is then blended with a polyolefin such as an ethylene-butene-1 copolymer.

The products of the invention can be used for any suitable uses for pigmented polyolefins. Included uses are polyolefin pipe, toys, blow-molded articles, and the like.

The invention is applicable to the mixing of polyolefin with any known polyolefin pigment. Suitable pigments for use in polyolefins are disclosed in Modern Plastics Encyclopedia (1965), pages 420–421, and include, for example, iron oxide, chromium oxide, cobalt aluminate, cadmium sulfide, titanium dioxide, carbon black, bone black, phthalocyanine blue, and the like. The invention is especially applicable for use in blending polyolefin with carbon blacks. Any of the carbon blacks known to the industry, such as the color blacks or the reinforcing blacks, can be used. These blacks can be made by any of the known channel or furnace processes from either gaseous or liquid feedstocks.

The pigment is present in the blend in an amount sufficient to impart coloration to the polymer and will generally be present in an amount of 0.01 to 5 parts per 100 parts of polyolefin.

Any of the polyolefins known to the industry can be used, such as the olefin polymers and copolymers made by the process of U.S. Patent No. 2,825,721, or polymers made with organometal catalyst, and the like. Examples of polymers that can be used are polyethylene, polypropylene, polybutene-1 and copolymers thereof including ethylene-butene-1 copolymers, and the like. Mixtures of polymers and copolymers can be used.

The blowing agent is present in an amount which is insufficient to cause blowing of the polymer. The blowing agent merely functions to disperse the pigment in the polyolefin and aid in preventing pigment agglomerates in the polyolefin. The blowing agent is present in an amount of 5 to 5000, preferably 10 to 2000, parts by weight per million based on the weight of polyolefin. As is understood by one skilled in the art, this amount is insufficient to cause any substantial blowing of the polymer, amounts in the range of 1 to 50 parts of blowing agent per 100 parts of polyolefin (10,000 to 500,000 per million of polyolefin) being required for substantial blowing of the polyolefin.

Blowing agents which can be used according to the invention are any known blowing agents. Specifically, the following blowing agents can be used:

4,4'-oxybis(benzenesulfonyl hydrazide),
Azobisformamide(azodicarbonamide),
Diphenylsulfon-3,3'-disulfonyl hydrazide,
Benzene-1,3-disulfonyl hydrazide,
Benzenesulfonyl hydrazide,
N,N'-dinitrosopentamethylenetetramine,
N,N'-dimethyl-N,N'-dinitrosoterephthalamide,
Diazoaminobenzene,
Azobisisobutyronitrile, and the like.

The blowing agent is mixed with the pigment, for example by dry mixing or by mixing a solution or slurry of blowing agent in an organic diluent with the pigment and evaporating the solvent. This mixture is then blended with the polyolefin by any means known to the industry, such as by the use of mechanical mixtures such as plastographs, roll mills, Banburys or the like. It is within the scope of the invention to blend the blowing agent-pigment mixture with a small amount of the polyolefin being used and to "let down" this concentrate with additional polymer to obtain the desired final concentration of pigment. It is also within the scope of the invention to add stabilizers, antistatic agents, reinforcing materials, vulcanizing agents, and the like to the polymer-pigment blend.

EXAMPLE

Polyolefin-carbon black blends were prepared using the following recipes by first preparing a concentrate and then "letting down" with additional polyolefin:

EXAMPLE I

| | Parts by Weight | | | |
|---|---|---|---|---|
| Run Number | 1 | 2 | 3 | 4 |
| Polyolefin [b] | 100 | 100 | 100 | 100 |
| Carbon Black [c] | 0.05 | 0.05 | 0.1 | 0.1 |
| Blowing Agent | 0 | 0.001 | 0.004 | 0.004 |
| Agent Used [a] | None | AZ | VAZO | AZ |

[a] AZ = azobisformamide; VAZO = azobisisobutyronitrile.
[b] An ethylene-butene-1 copolymer made by the process of U.S. 2,825,721 and identified as Marlex® 5003.
[c] A color black identified as Monarch 74.

Prior to blending the carbon black and polyolefin, the carbon black was mixed with a solution of the blowing agent in 100 parts by volume of toluene, and the toluene was evaporated. Blending was effected on a roll mill, and a milling time of 10 minutes was used at a temperature of about 310° F.

A control blend (Blend 1) was made in the same manner, except that no blowing agent was used.

These blends were aged in an Atlas Weatherometer under a UV light in circulating air at about 140° F. They were subjected to a water spray for 18 minutes out of each 2 hours. Properties of the blends were determined initially and after aging for 600 and 800 or 1000 hours:

| Aging Time, Hr. | | Blend | | | |
|---|---|---|---|---|---|
| | | 1 | 2 | 3 | 4 |
| 0 | Tensile, p.s.i. | 3,905 | 3,870 | 3,750 | 3,830 |
| | Elongation, percent | 330 | 220 | 183 | 497 |
| 600 | Tensile, p.s.i. | 3,707 | 3,805 | 3,485 | 3,610 |
| | Elongation, percent | 10 | 25 | 30 | 240 |
| 800 | Tensile, p.s.i. | 3,250 | 3,530 | (d) | e 3,682 |
| | Elongation, percent | 10 | 20 | e 22 | e 210 |
| 1,000 | Tensile, p.s.i. | | | | 3,755 |
| | Elongation, percent | | | 15 | 180 | d Interpolation not possible.
e Interpolated.

These data show that premixing the black with a small amount of blowing agent resulted in a considerably better retention of both tensile strength and elongation. The effect is observed more markedly by the elongation retention. After 800 hours aging, the blends of the invention maintained higher tensile strength and greater percent elongation than the blend made without the use of the blowing agent.

Reasonable variation and modification are possible within the scope of the foregoing disclosure and the appended claims to the invention without departing from the spirit thereof.

I claim:
1. A method for producing an olefin polymer-pigment blend comprising mixing together said pigment with a small amount of a blowing agent, and blending the mixture thus formed with said olefin polymer under conditions to disperse substantially uniformly said mixture in said olefin polymer.

2. A process according to claim 1 wherein said blowing agent is present in an amount insufficient to cause blowing of the olefin polymer.

3. A method according to claim 1 wherein said blowing agent is present in an amount in the range of 5 to 5000 weight parts per million based on said olefin polymer.

4. A method according to claim 1 wherein said blowing agent is selected from the group consisting of azobisformamide and azobisisobutyronitrile, said olefin polymer is an ethylene-butene-1 copolymer, and said blowing agent is present in an amount within the range of 10 to 2000 parts by weight per million parts by weight of said olefin polymer, and said pigment comprises carbon black.

5. A method according to claim 1 wherein said blowing agent is present in amount within the range of 10 to 2,000 parts by weight per million parts by weight of said olefin polymer and said pigment is present in an amount within the range of 0.01 to 5 parts per 100 parts of said olefin polymer.

References Cited

UNITED STATES PATENTS 3,098,831  7/1963  Carr _____ 260—2.5
3,278,466  10/1966  Cram et al. _____ 260—41

MORRIS LIEBMAN, *Primary Examiner.*

S. L. FOX, *Assistant Examiner.*